United States Patent
Dasgupta et al.

(10) Patent No.: US 7,570,012 B2
(45) Date of Patent: Aug. 4, 2009

(54) ENERGY STORAGE DEVICE FOR LOADS HAVING VARIABLE POWER RATES

(75) Inventors: Sankar Dasgupta, Mississauga (CA); James K. Jacobs, Toronto (CA); Rakesh Bhola, Toronto (CA)

(73) Assignee: Electrovaya Inc., Mississauga, Ontario (CA)

( * ) Notice: Subject to any disclaimer, the term of this patent is extended or adjusted under 35 U.S.C. 154(b) by 0 days.

(21) Appl. No.: 12/010,016

(22) Filed: Jan. 18, 2008

(65) Prior Publication Data

US 2008/0111508 A1   May 15, 2008

Related U.S. Application Data

(63) Continuation of application No. 10/661,813, filed on Sep. 15, 2003, now abandoned, which is a continuation-in-part of application No. 10/106,782, filed on Mar. 27, 2002, now abandoned.

(30) Foreign Application Priority Data

Apr. 5, 2001  (CA) .................................... 2343489

(51) Int. Cl.
*H02J 7/00*  (2006.01)
(52) U.S. Cl. ...................................... 320/104
(58) Field of Classification Search ................. 320/104; 307/10.1; 318/376; 429/9, 156
See application file for complete search history.

(56) References Cited

U.S. PATENT DOCUMENTS

| | | | |
|---|---|---|---|
| 3,883,368 A | 5/1975 | Kordesch et al. | |
| 4,277,737 A | 7/1981 | Muller-Werth | |
| 4,684,590 A | 8/1987 | Sammells | |
| 4,709,200 A | 11/1987 | Ochiai | |
| 5,300,372 A | 4/1994 | Aksoy et al. | |
| 5,455,637 A | 10/1995 | Kallman et al. | |
| 5,473,938 A | 12/1995 | Handfield et al. | |

(Continued)

FOREIGN PATENT DOCUMENTS

CA      2343489      10/2002

(Continued)

OTHER PUBLICATIONS

McGraw-Hill Electronics Dictionary, Sixth Edition, published 1997, p. 328 (3 pages).

(Continued)

*Primary Examiner*—Adolf Berhane

(57) ABSTRACT

An electrical energy storage device for storing electrical energy and supplying the electrical energy to a driving motor at different power levels is disclosed. The electrical storage device has an energy battery connected to a power battery. The energy battery has a higher energy density than the power battery. However, the power battery can provide electrical power to the electrical motor at different power rates, thereby ensuring that the motor has sufficient power and current when needed. The power battery can be recharged by the energy storage battery. In this way, the power battery temporarily stores electrical energy received from the energy battery and both batteries can provide electrical energy at the different power rates as required by the motor. The energy storage device can be releasably connected to an external power source in order to recharge both batteries. Both batteries can be recharged independently to optimize the recharging and lifetime characteristics of the batteries.

18 Claims, 7 Drawing Sheets

U.S. PATENT DOCUMENTS

| | | | |
|---|---|---|---|
| 5,549,172 | A | 8/1996 | Mutoh et al. |
| 5,550,738 | A | 8/1996 | Bailey et al. |
| 5,563,454 | A | 10/1996 | Araki et al. |
| 5,780,980 | A | 7/1998 | Naito |
| 5,808,448 | A | 9/1998 | Naito |
| 5,849,426 | A | 12/1998 | Thomas et al. |
| 5,883,496 | A | 3/1999 | Esaki et al. |
| 5,900,720 | A | 5/1999 | Kallman et al. |
| 5,993,983 | A | 11/1999 | Rozon |
| 5,998,960 | A | 12/1999 | Yamada et al. |
| 6,083,645 | A | 7/2000 | Takeuchi et al. |
| 6,132,902 | A | 10/2000 | Miyasaka |
| 6,159,635 | A | 12/2000 | Das Gupta |
| 6,215,198 | B1 | 4/2001 | Inada et al. |
| 6,331,365 | B1 | 12/2001 | King |
| 6,352,793 | B2 | 3/2002 | Kitoh et al. |
| 6,366,055 | B1 | 4/2002 | Ookoshi et al. |
| 6,384,489 | B1 | 5/2002 | Bluemel et al. |
| 6,441,581 | B1 | 8/2002 | King et al. |
| 6,479,186 | B1 | 11/2002 | Nemoto et al. |
| 6,577,103 | B2 | 6/2003 | Tanaka et al. |
| 6,591,758 | B2 | 7/2003 | Kumar |
| 6,608,396 | B2 | 8/2003 | Downer et al. |
| 6,647,939 | B2 | 11/2003 | Manabe et al. |
| 6,680,600 | B2 | 1/2004 | Emori et al. |
| 6,700,349 | B2 | 3/2004 | Emori et al. |
| 6,737,822 | B2 | 5/2004 | King |
| 6,800,962 | B2 | 10/2004 | Bahl et al. |
| 6,864,663 | B2 | 3/2005 | Komiyama et al. |
| 6,904,342 | B2 | 6/2005 | Hanada et al. |
| 6,917,181 | B2 | 7/2005 | Emori et al. |
| 6,924,621 | B2 | 8/2005 | Jabaji et al. |
| 2001/0011050 | A1 | 8/2001 | Yamaguchi et al. |
| 2001/0052760 | A1 | 12/2001 | Amano et al. |
| 2002/0004167 | A1 | 1/2002 | Jenson et al. |
| 2003/0000759 | A1 | 1/2003 | Schmitz et al. |
| 2003/0160510 | A1 | 8/2003 | Mizutani et al. |
| 2003/0186116 | A1 | 10/2003 | Taniou |
| 2003/0233179 | A1 | 12/2003 | Matsubara et al. |
| 2004/0007399 | A1 | 1/2004 | Heinzmann et al. |
| 2004/0189226 | A1 | 9/2004 | King |
| 2005/0083722 | A1 | 4/2005 | Emori et al. |

FOREIGN PATENT DOCUMENTS

| | | |
|---|---|---|
| EP | 0 410 559 A2 | 1/1991 |
| EP | 0 564 149 A2 | 10/1993 |
| JP | H07-073901 | 3/1995 |
| JP | H07-075251 | 3/1995 |
| JP | H07-154924 | 6/1995 |
| JP | H09-180763 | 7/1997 |
| JP | H09-247850 | 9/1997 |
| JP | 2000-149659 | 5/2002 |
| TW | 0543229 | 7/2003 |
| WO | WO 0054359 A1 | 9/2000 |

OTHER PUBLICATIONS

G. Hubaev, "Battery-driven vehicles", Research Institute "Avtoprom", 1967, p. 42, Moscow.

ENERGY STORAGE DEVICE FOR LOADS HAVING VARIABLE POWER RATES

RELATED APPLICATIONS

This application is a continuation of U.S. application Ser. No. 10/661,813 filed Sep. 15, 2003 entitled "Energy Storage Device for Loads Having Variable Power Rates", which is a continuation-in-part of U.S. application Ser. No. 10/106,782 filed Mar. 27, 2002 and entitled "Energy Storage Device For Loads Having Variable Power Rates".

FIELD OF THE INVENTION

The present invention relates to an apparatus, device and method for storing electrical energy and providing the electrical energy to an electrical load at different power rates. More particularly, the present invention relates to an apparatus, device and method utilizing a hybrid battery to provide variable power rates to an electrical load, such as an electric motor or engine utilized in driving a vehicle.

BACKGROUND OF THE INVENTION

In the past, various manners of storing and providing electrical energy to drive an electrical load, such as an electrical driving motor, have been proposed. For example, different types of batteries, including lead-acid, nickel cadmium (Ni—Cd) and nickel metal hydride (Ni—MH), have been used in the past to drive electric vehicles. However, each type of battery has unique advantages and disadvantages.

For example, lead-acid batteries have the advantage that they can provide a high burst of power when required. Moreover, lead-acid batteries can provide large currents sufficient to accelerate and drive electrical loads, such as electrical motors and engines in vehicles. However, lead-acid batteries suffer from the disadvantage of having low energy density, sometimes expressed or measured, as Watt-hour per liter (W-h/l), meaning that the energy provided per unit volume is low. Likewise, lead-acid batteries have relatively low specific energy, expressed as watt-hour per kilogram (W-h/kg), meaning that a relatively large mass is needed to store a substantial quantity of energy.

By contrast, lithium-based batteries, such as lithium batteries having anodes or negative electrodes of lithium metal or alloy, and non-aqueous rechargeable lithium ion batteries, as disclosed for instance in U.S. Pat. No. 6,159,635, issued to Das Gupta et al., have higher energy density and specific energy characteristics than lead or nickel based electrochemical cells. It should be noted, that some types of non-aqueous rechargeable lithium ion batteries are referred to as polymer lithium batteries, due to being packaged and sealed in polymer layers and having lithium ion conducting polymer electrolytes. On the other hand, lithium based batteries may not be able to provide large bursts of power, in particular, high current densities, on account of the intrinsic high impedance of such lithium based cells. Furthermore, to prevent degradation, lithium based cells require thermal management techniques to maintain the battery at an acceptable temperature, such as −20° C. to a maximum of 70° C. Power bursts in lithium ion cells generally generate larger amounts of heat energy, which, if not managed properly, can degrade the battery.

In an electrical vehicle, it is desirable to have an energy storage device which has a high energy density, so that a minimum volume is occupied by the energy storage device, as well as a high specific energy, so that minimum weight is transported along with the vehicle. However, it is also desirable to have an energy storage device which can provide large bursts of power. In particular, a burst of power is generally required to overcome stationary friction and the inertia of a stationary electrically driven vehicle, as well as for acceleration. It is noted that attempts have been made to redesign rechargeable lithium batteries to be able to provide higher currents, but this led to lower specific energies and lower energy densities of such battery devices.

In the past, several different types of energy storage devices have been proposed in an effort to provide a high energy storage device that provide large bursts of power. For example, U.S. Pat. No. 5,780,980 and U.S. Pat. No. 5,808,448, both to Naito, disclose an electric car drive system having a direct current power supply comprising a fuel cell connected to a lead-acid battery. The fuel cell produces a constant output while operational and supplies electrical power to the car when the power rate for the electrical load is low. When the power rate for the electrical load increases, power is supplied by the lead-acid battery, as well as by the fuel cell. Naito also discloses that the fuel cell recharges the lead-acid battery when the charge for the lead-acid battery is below a specified value. However, Naito suffers from the disadvantage that the fluid reactants to operate the fuel cell must be carried in containers on the vehicle. This greatly reduces the specific energy capability of the device. Also, Naito discloses an elaborate electrical circuit to permit supply of energy from the fuel cell and the lead-acid battery.

European Patent Office application number 0 564 149 A2 to Okamura, discloses utilizing capacitors connected in series and in parallel, but does not disclose the use of batteries. Furthermore, Okamura discloses specific circuits for detecting whether or not the capacitor is at the fully charged level to prevent over charging. Likewise, European Patent Office application number 0 410 559 A2 to Shirata discloses using capacitors, but Shirata also relates to using the capacitors to energize a starter motor which in turn starts a gasoline engine. Similarly, U.S. Pat. No. 5,998,960 to Yamada discloses using a capacitor with a battery in combination with a gasoline engine to assist in regenerative braking, and, other means to limit the use of the gasoline engine and thereby limit fuel consumption and reduce exhaust gases. In this way, both Yamada and Shirata are not directly concerned with storing large amounts of power, because both disclose use of the power storage system in combination with gasoline or other fossil fuel engines. Furthermore, both Yamada and Shirata relate to circuits which are focused on their specific purposes; for Shirata this relates to assisting the starter engine to start the engine, and, for Yamada, this relates to using a chopper to maintain the voltage, such as during regenerative braking, at specific levels.

For much smaller loads, such as in the micro-electronic field, as used in electrochromic eye wear, lithium/thionyl-chloride and lead-acid hybrid batteries have been proposed. For instance, U.S. Pat. Nos. 5,900,720 and 5,455,637 to Kallman disclose using a hybrid battery comprising a primary, that is non-rechargeable, lithium/thionyl chloride battery cell and a secondary sealed lead-acid battery to power micro-electronic circuits. The primary and secondary batteries power a load, which in the case of Kallman are low power micro-electronic circuits for electrochromic eye wear. The primary battery also powers a controller which, in turn, can periodically charge the secondary battery. However, Kallman does not disclose that the primary lithium/thionylchloride battery is recharged. Also, the Kallman device is designed to be small with relatively low total energy output, and as such, could not be utilized for larger loads.

Also, capacitors have been used in the past as disclosed, for instance, in European application 0 564 149 A2 to Jeol Ltd. However, as disclosed in this application, capacitors are much more sensitive to the applied voltage and, if the voltage applied to the capacitor exceeds the rated voltage, then the capacitance of the capacitor is immediately reduced and the leakage current increases. Because of this, European application 0 564 149 A2 discloses at length control circuits to limit charging of the capacitors, but has no disclosure relating to use of batteries nor how to control the batteries.

Accordingly, there is a need in the art for an efficient energy storage device having a relatively high energy density and relatively high specific energy for use with large loads having variable power demands. Moreover, while energy density is an important consideration, it is also necessary to consider how the batteries will be housed within the vehicle. In other words, the effective volume of the device including the batteries, meaning the total volume required to house the batteries rather than the volume of the individual cells, must be considered. Yet another consideration should be the charging of the system after the output has dropped below a predetermined level.

SUMMARY OF THE INVENTION

Accordingly, it is an object of this invention to at least partially overcome the disadvantages of the prior art. In addition, it is an object of the invention to provide an efficient energy storage device for use in relatively large load situations, such as for an electrical vehicle, and preferably having a high specific energy and energy density, while still being capable of providing large bursts of power in a thermally manageable manner.

Accordingly, in one aspect, the present invention provides a power source for supplying electrical power to a driving motor, said driving motor drawing electrical power at different rates, the power source comprising: a first rechargeable energy battery having a first energy density for storing electrical energy; a second rechargeable power battery having a second energy density, which is less than the first energy density, for storing electrical energy and providing electrical power to the electrical motor at the different rates; battery controller for controlling the continuous recharging of the power battery with electrical energy from the energy battery; and wherein electrical energy stored in the energy battery is supplied to the electrical motor through the power battery and at the different rates.

In another aspect, the present invention provides an energy storage device for storing electrical energy to be delivered to an electrical load, said energy storage device comprising: a first rechargeable battery having a first energy density and electrically connectable to an external power source; a second rechargeable battery having a second energy density, less than the first energy density, said second battery being electrically connected to the first battery and electrically connectable to the load; wherein, during operation, the second battery is connected to the load and supplies electrical energy to the load while the first battery continually recharges the second battery; and wherein the first battery is periodically connected to the external source for recharging as required.

In still a further aspect, the present invention provides an energy storage device for storing electrical energy to be delivered to an electrical load, said energy storage device comprising: a rechargeable battery having a first energy density and electrically connectable to an external power source; a rechargeable electrical device having a second energy density, less than the first energy density, said second battery being electrically connectable to the first battery and electrically connectable to the load; wherein, during operation, the rechargeable electrical device is connected to the load and supplies electrical energy to the load while the battery substantially continuously recharges the rechargeable electrical device; and wherein the battery is periodically connected to the external source for recharging as required.

In a further aspect, the present invention provides a method for storing electrical energy for an electrical load drawing electrical power at different rates, said method comprising: charging a first rechargeable energy battery having a first energy density; charging a second rechargeable power battery having a second energy density, less than the first energy density; supplying electrical energy from the second power battery to the electrical load at the different rate; and recharging the second power battery from the first energy battery.

In a further aspect, the present invention provides a power source for supplying electrical power to a driving motor, said driving motor drawing electrical power at different rates, the power source comprising a first rechargeable energy battery having a first total impedance for storing electrical energy and providing electrical power to the electrical motor at a first range of power rates; a second rechargeable power battery having a second total impedance, less than the first total impedance, for storing electrical energy and providing electrical power to the electrical motor at a second range of power rates; wherein electrical energy stored in the energy battery is provided to the driving motor at the first range of power rates in combination with electrical energy stored in the power battery; and wherein the energy battery substantially continuously recharges the power battery with any excess power.

In a further aspect, the present invention provides a power source for supplying electrical power to a driving motor, said driving motor drawing electrical power at different rates, the power source comprising: a first rechargeable energy battery having a first total impedance for storing electrical energy and providing electrical power to the electrical motor at a first range of power rates; a second rechargeable power battery having a second total impedance, less than the first total impedance, for storing electrical energy and providing electrical power to the electrical motor at a second range of power rates; wherein the energy battery is directly connected in parallel with the power battery and the driving motor such that the electrical energy stored in the energy battery is provided to the driving motor in combination with electrical energy stored in the power battery; and wherein the energy-battery substantially continuously recharges the power battery with any excess power not provided to the driving motor.

In a still further aspect, the present invention provides a method for storing electrical energy for an electrical load drawing electrical power at different rates, said method comprising: charging a rechargeable energy battery having a first total impedance; charging a rechargeable power battery having a second total impedance, less than the first total impedance; supplying electrical energy from the energy battery and the power battery to the electrical load, said rechargeable power battery, said rechargeable energy battery and said electrical load are connected to each other in parallel such that electrical energy stored in the energy battery is provided to the electrical load in combination with energy stored in the power battery when required by the electrical load, and, when not required by the electrical load electrical energy from the energy battery substantially recharges the power battery; substantially continuously recharging the power battery from the energy battery with electrical energy not required by the electrical load.

One advantage of the present invention is that the energy battery can be a conventional lead-acid battery which is commonly used in vehicles. In this way, the lead-acid battery can provide sufficient bursts of power, and at sufficient current, to drive an electrical load having variable power demands, such as an electrical motor in a vehicle. However, the energy battery is preferably a lithium based cell or battery which will have a high energy density and high specific energy. Accordingly, by having the energy battery substantially continuously charging the power battery, the power battery can be maintained close to its optimum charge level, which should improve the life span of the power battery. Furthermore, by having the power battery near its optimum charge level, the energy generating capability of the power battery can be maintained and energy can be provided to the load at variable rates, thereby more readily satisfying the power demands of the load. However, as the major energy storage portion of the energy providing system of the present invention resides in the energy battery having high energy density and specific energy, relatively little extra volume and weight is added to the vehicle.

In one of the further embodiments, the lithium battery is a polymer lithium battery which comprises a non-aqueous, rechargeable lithium ion battery encased or wrapped and sealed in plastic covers, having solid polymer and organic liquid, lithium ion conducting electrolytes. Such polymer lithium ion batteries can be produced in specific shapes or forms, and molded into an appropriate shape which can occupy a space otherwise left vacant within the vehicle. In this manner, the effective volume of the energy storage device can be reduced, by ensuring that little space is wasted around the energy battery.

A further advantage of the present invention is that both batteries in the energy storage device can be recharged. As stated above, the energy battery is substantially continuously recharging the power battery. However, when required, the energy battery can also be recharged by being connected to an external source. In this way, the energy storage device can be easily regenerated for continued use and does not require the addition of fluid reactants or replacement of the batteries. Furthermore, in a preferred embodiment, the power battery can be recharged from the external source when the energy battery is being recharged to improve recharging efficiency.

A still further advantage of the present invention is that, because a lead-acid battery is utilized, existing energy recovery techniques can be used. In particular, the energy generated during braking can be harnessed for replenishing the energy level of the lead-acid battery when the vehicle is brought to a stop. This procedure is often referred to as regenerative braking.

Just as certain loads require occasional or periodic bursts of energy, some charging sources can make available bursts of energy from time to time. The regenerative braking of a vehicle is an example of such a "burst-type" charging source. If the energy storage device is capable of accepting charge at a high rate, these bursts of energy can be efficiently accepted. An advantage of the present invention is that occasional or periodic bursts of power can be used to rapidly recharge the power battery at a rate that may not be accepted efficiently by the energy battery, or, could damage the energy battery. A subsequent heavy load might use the energy from this "burst type" charging source directly from the power battery. Alternately, the power battery might be used to recharge the energy battery at a lower rate over a longer period of time. Which routing of energy is most effective in any particular use will of course vary with the time-dependent energy needs of the electrical load and the particular application of the energy storage device.

In a further preferred embodiment, inherent control can be used to control the flow of power from the energy battery and the power battery to the load. Inherent control can result for instance by initially controlling the power battery and energy battery to be at same voltage and connecting the energy battery, power battery and load, in parallel. The flow of current to the load will then be controlled by inherent characteristics of the power battery, energy battery and load, as discussed in more detail below.

In a further preferred embodiment, energy can be provided from both energy battery and power battery to the load. In this way, the range of power rates of the energy battery and power battery can be combined to provide electrical energy at a larger range of power rates. When the time-dependent energy needs of the electrical load decrease, such as when the load is off, electrical energy from the energy battery could be used to charge the power battery. This can occur, for instance, if inherent control is utilized, such as by connecting the power battery, energy battery and load in parallel.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS OF THE INVENTION

Figure 1:
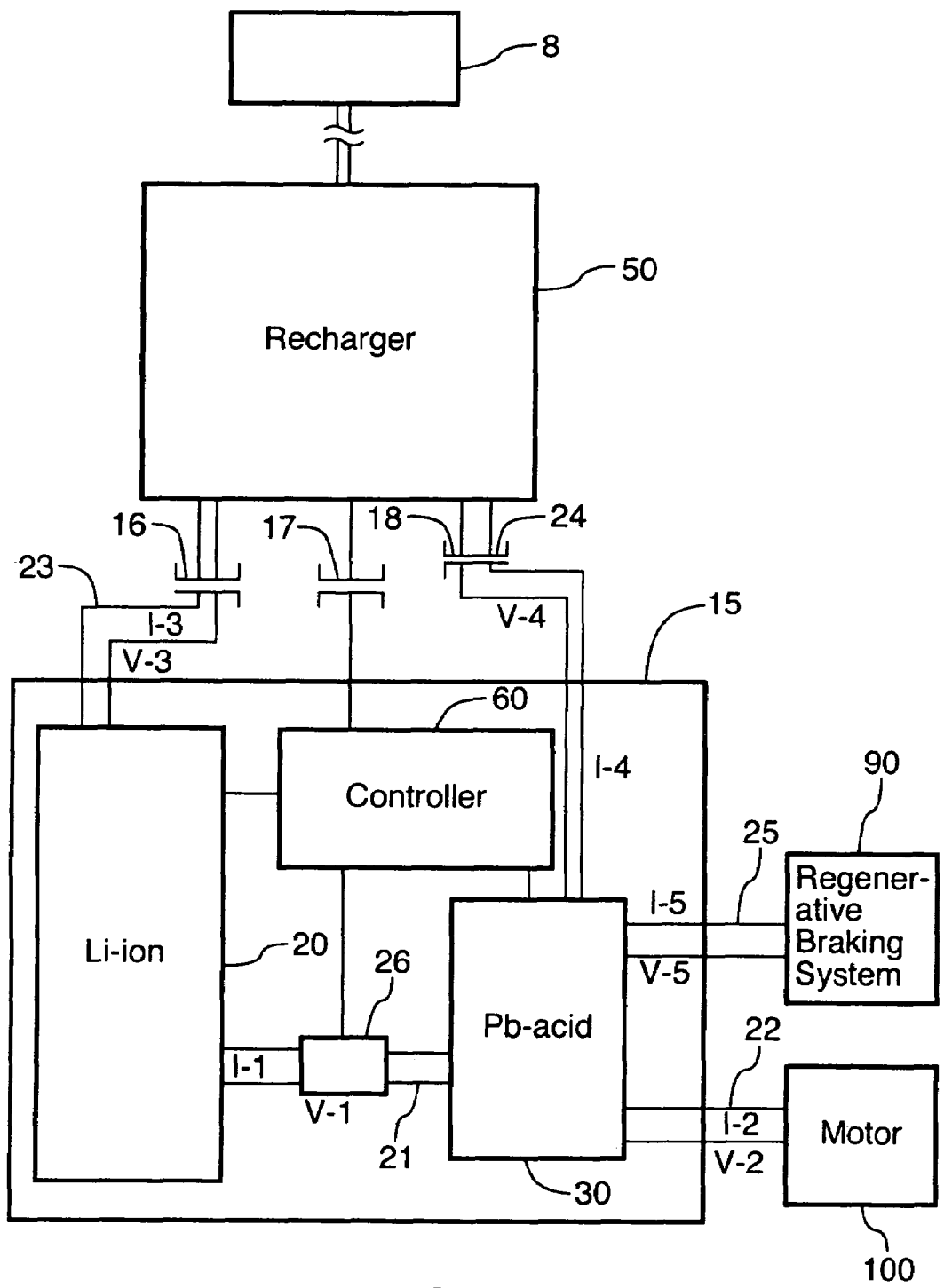
FIG. 1 shows an electrical system comprising an electrical storage device according to one embodiment of the present invention.

As described herein above, in one preferred embodiment of the invention, an energy storage device comprising an energy battery connected to a power battery is provided. The energy battery has a high energy density and a high specific energy so that it can easily and efficiently store a large amount of energy. The energy battery is also rechargeable from external sources. The energy battery is capable of providing a relatively steady energy output, but may have a relatively low current level. In other words, the energy battery performs the principal function of efficiently storing a large amount of energy, without having a great deal of mass or occupying a great deal of space, but may not be able to provide high or variable current levels or variable power output.

By contrast, the power battery is designed to have variable power output and to be capable of providing short high current pulses. For example, the power battery will be capable of providing high bursts of power at short high current pulses as required by the electrical load, such as the power requirements of an electrical motor or engine utilized in driving a vehicle, including trucks, automobiles, motorcycles and smaller two wheeled bicycles such as motorcycles and electric bicycles, sometimes referred to as mopeds. Accordingly, the power battery will be able to provide electrical power to the motor at a range of power rates which is greater than the range of power rates which the energy battery can provide power. However, the power battery may not have a high energy density or high specific energy. In particular, the power battery is rechargeable and can be recharged by the energy battery and optionally by an external power source.

In operation, the power battery meets the variable current and power demands of an electrical load and can be recharged by the energy battery. In this way, the electrical storage device provides a hybrid battery having high energy density and high specific energy because of the energy battery, while still providing variable power rates as well as high bursts of current as required by electrical loads, because of the power battery.

The electrical storage device also comprises a controller for coordinating, charging and working of the energy battery, as well as the power battery. The controller also coordinates the charging and working of the energy battery and the power battery in order to preserve longevity of both, such as by preventing overcharging of the power battery and overheating of the energy battery. The controller also optionally incorporates an instrument panel indicative of the voltage and current flow from the energy battery to the power battery, as well as from the power battery to the electrical load. The controller also optionally indicates, such as through a warning or alarm device, the approach of the lowest permissible potential level of the energy battery so that recharging of the energy battery can occur. The energy battery, and optionally the power battery, can be recharged from an external source. The controller may also coordinate the recharging of the energy battery, and also the power battery, from the external source.

FIG. 1 illustrates an electrical system, shown generally by reference numeral 10, utilizing an energy storage device 15 according to one embodiment of the present invention. As illustrated in FIG. 1, the system 10 comprises the energy storage device 15 connected to a load, shown as motor 100 in FIG. 1.

As also illustrated in FIG. 1, the energy storage device 15 comprises two rechargeable batteries 20, 30. The first battery is an energy battery 20 and the second battery is a power battery 30.

As also illustrated in FIG. 1, the energy battery 20 is connected to the power battery 30 through a first connection 21. The power battery 30 is in turn connected to an electrical load, which in this embodiment is an electrical motor 100, through a second connection 22. During operation, the power battery 30 supplies electrical energy through the second connection 22 to drive motor 100, and, the energy battery 20 supplies electrical energy through the first connection 21 to substantially continuously recharge the power battery 30.

The power battery 30 provides power to the motor 100 through the second connection 22 at a second voltage V-2 and a second current I-2. It is understood that the second voltage V-2 and the second current I-2 will vary to permit the power battery 30 to supply bursts of current and electrical power at different rates depending on the requirements of the motor 100. Accordingly, the power battery 30 is selected and designed to satisfy the power rate, as well as current I-2 and voltage V-2 requirements, of the electrical load.

In the embodiment where the electrical load is a motor 100, the motor 100 may be, for example, a 96 volt motor operating at between 75 and 500 amps. In this case, it is convenient and preferable that the power battery 30 has at least a 5 kilowatt hour capacity or higher. The lead-acid battery 30 is preferred so that high bursts of power at short high current pulses can be provided to the motor 100. However, other high power batteries, such as nickel metal or nickel alloy hybrid bearing batteries or nickel cadmium batteries, may also be used instead of lead-acid batteries.

In some embodiments, the device 15 may comprise rechargeable electrical storage devices in addition to batteries.

By contrast, the energy battery 20 is designed to store a large amount of electrical energy. As such, the energy battery 20 preferably has an energy density which is relatively high, preferably higher than the energy density of the power battery 30. In this way, the energy battery 20 can efficiently store large amounts of electrical energy. Furthermore, because the power battery 30 has been selected to satisfy the variable power requirements of the motor 100, the energy battery 20 can be selected without concern to the power requirements of the motor 100. Rather, the principle concern of the energy battery 20 is that the energy battery 20 is capable of efficiently storing and providing electrical energy at desirable levels, and at appropriate voltages and currents, to substantially continuously recharge the power battery 30 so that the power generating capability of the power battery 30 can be maintained. In a further embodiment, illustrated in FIG. 3 and discussed in more detail below, the energy battery 20 also supplies electrical power to the load, and, recharges the power battery with the portion of the electrical energy not provided to the load.

In the preferred embodiment, the energy battery 20 is a lithium battery, but any other battery capable of this function can be used. More preferably, a non-aqueous rechargeable lithium ion battery is utilized as the energy battery 20.

In another preferred embodiment, the non-aqueous rechargeable lithium ion battery can be a polymer lithium ion battery which is moldable into various shapes. In this way, molding the polymer lithium battery to occupy any allotted space can decrease the effective volume of the energy storage device 15. Furthermore, the polymer lithium ion battery may be molded to occupy otherwise unused space, such as the space between other components or body parts in a vehicle. In yet another preferred embodiment, the polymer lithium ion battery may be molded to act as the casing or housing of the device 15 as a whole, thereby further decreasing the effective volume of the energy storage device 15.

The first current I-1 and the first voltage V-1 of the first connection 21 are selected so as to provide optimum life for the energy battery 20 and the power battery 30. For instance, the current I-1 is preferably selected so as to minimize detrimental effect on the energy battery 20, such as the heat generation by the energy battery 20. The current I-1 is also preferably selected to provide sustained high energy at desirable levels to continuously recharge the power battery 30 and thereby maintain the power generating capability of the power battery 30, as well as satisfy the long term demands of the energy battery 20 and the power battery 30. Accordingly, for longevity, it is preferred that the first voltage V-1 and the first current I-1 be selected such that the power being transferred from the energy battery 20 to the power battery 30 is sufficient to satisfy the energy demands placed on the power battery 30 by the motor 100, but also be relatively low so that temperature effects of the energy battery 20 will be decreased.

Furthermore, in the case where the power battery 30 is a lead-acid battery 30, longevity can be obtained by keeping the lead-acid battery 30 near its top charge level. This can be accomplished in a preferred embodiment by having substantially continuous flow of the first current I-1 to the power battery 30 so that the energy battery 20 is substantially continuously recharging the power battery 30. By having the first current I-1 relatively low, the energy transfer rate will also be correspondingly lower, but this can be accounted for by substantially continuously recharging the power battery 30 with electrical energy from the energy battery 20.

In order to control the flow of current and electrical energy between the batteries 20, 30, the electrical energy storage device 15 also comprises a controller 60. The controller 60 is connected to the batteries 20, 30, as well as the first connection 21, to regulate the flow of power from the energy battery 20 to the power battery 30.

As also illustrated in FIG. 1, a regenerative braking system 90 is connected through a fifth connection 25 to the power battery 30. While the vehicle is braking, the regenerative braking system 90 converts the kinetic energy from the moving vehicle into electrical energy, as is known in the art. The regenerative braking system 90 delivers this recaptured electrical energy preferably to the power battery 30 through the fifth connection 25 at the fifth current I-5 and the fifth voltage V-5.

In one embodiment, the controller 60 controls the flow of energy over the first connection 21 by controlling a first current I-1 and first voltage V-1, such as through a switch 26. For example, by the controller opening and closing the switch 26, the controller 20 can control the energy flow from one battery to the other. It is known in the art that this type of switch 26 may operate rapidly, and may include capacitors, inductors, and other components such that control of the flow of electricity may be accomplished at relatively high efficiency. For instance, when the electrical energy flows from a higher voltage source to a lower voltage recipient, the switch 26 is said to operate in "buck" mode. If the voltage of the source is lower than the voltage of the recipient, the switch 26 is said to operate in "boost" mode. Switch designs which operate in one or the other (or either) of these modes are known in the art and accordingly not discussed at length here.

In this preferred embodiment, the energy battery 20 is constructed so that its voltage is generally somewhat higher than the voltage of the power battery 30, even when the energy battery 20 is at the end of its useful capacity. In this way, the switch 26 can be designed to operate always in buck mode which is preferable for reasons of cost and efficiency, but limits the flow of energy to be unidirectional from the energy battery 20 to the power battery 30. With this limitation, at any time that a regenerative braking surge of power is expected to be delivered to the power battery 30, the power battery 30 is preferably at a state of capacity low enough to accept this energy without becoming overcharged, and the load characteristics preferably allow this situation to be maintained without the need for recharging of the energy battery 20 by the power battery 30. When the energy storage device 15 is used in an electric vehicle, the energy returned by the regenerative braking system 90 is almost always lower than the energy previously supplied for acceleration. Therefore, it is generally possible to maintain a state of charge capacity in the power battery 30 to accommodate most bursts of power from the regenerative braking system.

In another embodiment, the switch 20 could operate in buck and boost mode permitting the power batter 30 to recharge the energy battery 20 if, for instance, the power battery 30 has been overcharged, such as by the regenerative breaking system 90.

FIG. 1 also illustrates a recharger 50 used to recharge the storage device 15 from external power sources 8. The recharger 50 is connectable to the energy storage device 15 through connectors 16, 17, 18.

In a preferred embodiment, the energy storage device 15 is used to power an electrical motor 100 in a vehicle (not shown). The device 15 would be contained within the vehicle. The energy battery 20 would recharge the power battery 30 substantially continuously, even when the vehicle is moving.

As these external power sources 8 are generally fixed, regeneration of the device 15 will generally occur when the vehicle is stationary. In this case, the recharger 50 could be located at a fixed location and would provide electrical power for regeneration of the energy storage device 15 from external power sources 8, such as hydro mains.

Connectors 16 and 18 supply energy from the recharger 50 separately to the energy battery 20 and the power battery 30. As illustrated in FIG. 1, the recharger 50 will deliver power to the energy battery 20, which in this embodiment is a non-aqueous lithium ion battery 20, through the third connection 23, formed by connector 16. The third connection 23 will provide power at a third voltage V-3 and third current I-3 selected to satisfy the recharging characteristics of the energy battery 20. Similarly, the recharger 50 will deliver power to the power battery 30 through the fourth connection 24, formed by the connector 18. The fourth connection 24 will provide power at a fourth voltage V-4 and fourth current I-4 selected to satisfy the recharging characteristics of the power battery 30. In this way, the recharger 50 can recharge both the energy battery 20 and the power battery 30 simultaneously.

The controller 60 may be connected to the recharger 50 through connection 17 to permit the controller 60 to control the voltages V-3 and V-4 and the currents I-3 and I-4. The controller 60 controls the voltages V-3 and V-4 and the currents I-3 and I-4 to ensure that the batteries 20, 30 are recharged efficiently and without damage.

The energy battery 20 will likely require more time to recharge because it has a larger energy storing and operating capacity, providing the result that the controller 60 will generally cease recharging the power battery 30 first. It is also understood that it is not necessary to have the recharger 50 recharge the power battery 30 at least because the power battery 30 can be recharged by the energy battery 20. In other words, in one embodiment, only the energy battery 20 is recharged by the external power source 8 through the recharger 50, and the energy battery 20 then recharges the power battery 30. In this embodiment, the connector 18 and the fourth connection 24, as well as the associated control circuitry for the voltage V-4 and current I-4 of the fourth connection 24, are not required, thereby decreasing the overall cost. However, having the connector 18 and the fourth connection 24 directly from the recharger 50 to the power battery 30 is generally preferred as it permits both batteries 20, 30 to be recharged simultaneously, and therefore decreases the overall charging time of the device 15.

Figure 2A:
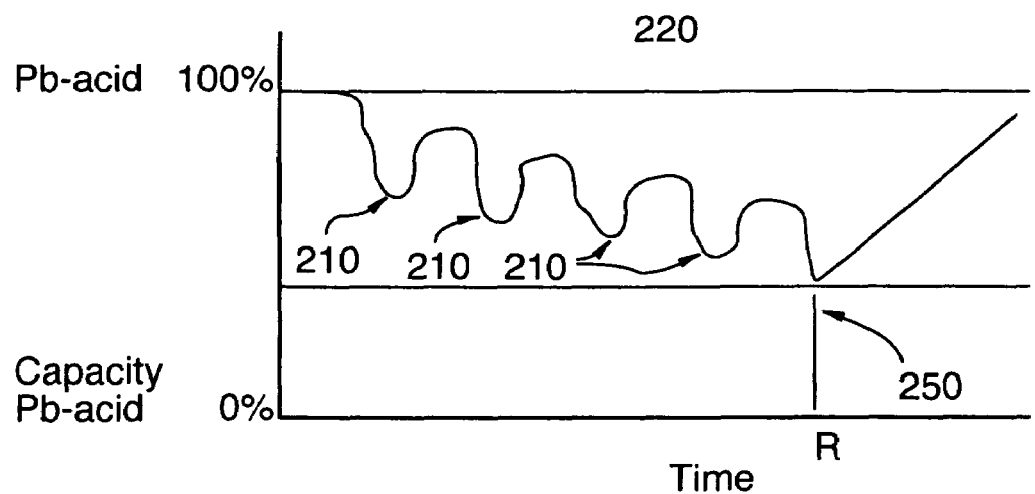
FIG. 2A shows a graph plotting the discharge of the lead-acid power battery against time.

FIG. 2A shows a graph plotting the discharge over time of the power battery 30. As shown in FIG. 2, the capacity of the power battery 30, which in this preferred embodiment is a lead-acid battery 30, will decrease in steps corresponding to sudden bursts of power 210 being required by the motor 100. The sudden bursts of power 210 will be required, for instance, to overcome inertia, stationary friction when the vehicle is stationary, and also for acceleration. However, once these initial bursts 210 have occurred, the capacity will begin to increase, even though the power battery 30 is supplying power to the motor 100, because the lithium battery 20 is continuously recharging the lead-acid battery 30. In other words, after an initial burst 210 has occurred, and the motor 100 is operating at a steady state moving the vehicle at a fairly constant speed, the non-aqueous lithium battery 20 should be recharging the power battery 30 at a level greater than the power battery 30 supplies energy to the motor 100. In this way, the capacity of the power battery 30 may increase even as it supplies energy to the motor 100 at steady state.

At the point labelled with the letter "R" in FIG. 2A, the device 15, including the lead-acid battery 30, will be recharged from a fixed external source 8 by means of the recharger 50. During recharging, shown in FIG. 2A by reference numeral 250, the lead-acid battery 30 will be recharged through the recharger 50 from a fixed external source 8 so that its capacity will increase.

In between recharging from a fixed external source 8, the power battery 30 can be substantially continuously recharged by the non-aqueous lithium ion energy battery 20. This substantially continuous recharging increases the capacity of the lead-acid battery 30 to temporary plateaus, illustrated by reference numeral 220 in FIG. 2A. These plateaus 220 represent the lead-acid battery 30 powering the motor 100 at low power levels while being continuously recharged by the lithium ion battery 20. In other words, these plateaus 220 represent a steady state level where energy is essentially flowing from the energy battery 20 through the power battery 30 and into the motor 100. While not shown, these plateaus 220 could also be sloped upwards towards the full or 100% capacity level of the lead-acid battery 30. This would illustrate that the energy battery 20 is supplying more than the required power levels to power the motor 100 and is also recharging the power battery 30 at a rate greater than the power rate of the motor 100 at that particular moment in time.

Figure 2B:
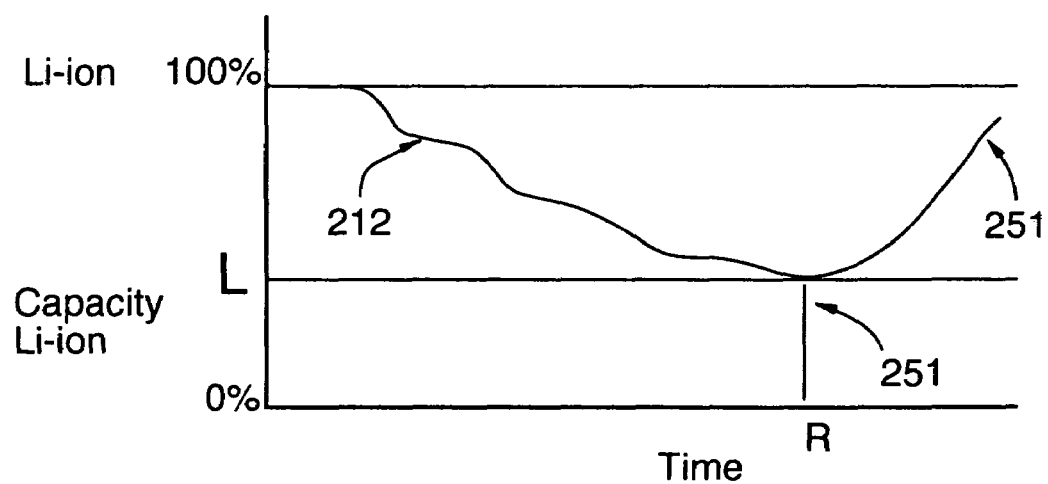
FIG. 2B shows a graph plotting the discharge of the non-aqueous rechargeable lithium energy battery pack against time.

FIG. 2B illustrates the capacity of the lithium ion energy battery 20 over time. As illustrated in FIG. 2B, the capacity of the energy battery 20 decreases over time fairly steadily. While the capacity of the energy battery 20 may have dips 212, corresponding to the sudden power bursts 210 of the power battery 30, these would not be as severe as the dips in the capacity of the power battery 30, at least because the energy battery 20 is not designed to transfer energy at a high rate. Likewise, as illustrated in FIG. 2B, the energy battery 20 will have less steep decreases in power corresponding to the plateaus 220 in the power battery 30. This represents the power battery 30 supplying electrical energy at lower power levels to the motor 100.

It is clear that, over time, the capacity of the lead-acid battery 30 will decrease, as shown in FIG. 2A. At the point labelled by the letter "R" in FIG. 2A, the device 15, including the energy battery 20, will be recharged. Recharging of the energy battery 20 is shown in FIG. 2B by reference numeral 251. As shown in FIG. 2A, during recharging the capacity of the energy battery 20 will increase gradually to near or at full capacity.

The device 15 will generally be recharged when the capacity of the energy battery 20 falls below a threshold, shown generally by the lower dashed line in FIG. 2B marked with the letter "L". While the capacity of the power battery 30 may be shown on the instrument panel and/or trigger an alarm, the capacity of the energy battery 20 will be the principal factor in determining when the device 15 must be recharged. The device 15 may comprise an alarm and/or instrument panel (not shown) to indicate when the capacity of the energy battery 20 is approaching or is at this threshold. This is indicated, for instance, in FIG. 2B by the point labeled by the letter "R". FIGS. 2A and 2B illustrate that the capacity of the power battery 30 and the energy battery 20 reach the lower threshold at about the same time. It is understood that this may not necessarily be the case, but rather the capacity of the energy battery will be the principle factor in determining when the device 15 should be recharged. It is also understood that the lower threshold for both batteries 20, 30 is selected to avoid damage or degradation to the energy battery 30 and/or the power battery 30.

Accordingly, using the energy storage device 15 as described above, energy can be provided from a high energy density energy battery 20 to a lower energy density power battery 30 and then onto an electrical load, which is the motor 100. In this way, the lower energy density power battery 30 essentially temporarily stores energy from the energy battery 20 to provide the energy at the rates required by the load 100. The high energy battery 30 can efficiently store the electrical energy for the vehicle.

A comparative example of a vehicle having a conventional lead-acid energy storage device and a vehicle having an energy storage device 15 of the present invention will now be provided to further describe and illustrate the present invention.

Initially, a conventional converted electric vehicle (Suzuki Motors/REV Consulting) with a 96 volt DC motor was equipped with a single series-connected bank of sixteen high-quality six-volt lead batteries (Trojan-Trade Mark) weighing a total of 523 kg, and occupying a volume of 225 liters, and having a nominal capacity at the 20 hour rate of 23.4 kilowatt hours. Weights and volumes are those of the batteries themselves and do not include the weight and volume of the support structures and housings used to mount, contain and cool the battery. Performance was acceptable, but the vehicle range was limited to about 70 kilometers per charge. Average motor current with the vehicle at a constant speed of 60 km/h was about 40 Amperes. Thus, well under half of the nominal capacity of this battery could be utilized. Peak motor current was 440 Amperes during acceleration.

The power system of the vehicle was then reconstructed with a energy battery 20 and an energy battery 30 according to an embodiment of the present invention as generally illustrated in FIG. 1. The energy battery 20 consisted of eight twelve-volt automotive lead batteries (Interstate-Trade Mark) in a series connection with a nominal voltage of 96 volts. These batteries are not rated for capacity but have a cranking current rating of 525 Amperes and a cold cranking current rating of 420 Amperes. Maximum voltage of this battery was about 110 volts at full charge. The energy battery consisted of a series/parallel arrangement of 480 lithium ion polymer cells, each of 11.4 Ampere-hour capacity, maximum rated current capability of 4 Amperes and nominal voltage of 3.65 volts (manufactured by Electrovaya, Toronto, Canada). With 12 parallel cells in a group and 40 groups in series, the battery had a maximum full-charge voltage of about 160 volts and a minimum voltage when discharged of about 120 volts.

The lead power battery 30 and lithium energy battery 20 were connected with a buck-mode switch operating at 115 kilohertz and providing about 90% efficiency. The switch controller 60 was set to allow 40A current flow from the energy battery 20 (charging the power battery 30) when the energy battery 20 dropped to 75% capacity and to stop current flow when the power battery 30 reached 80% charge capacity. The energy battery 30 could be charged from an external source 8 using a 220 volt single-phase 60 Hz supply with a maximum current rating of 20 Amperes and was controlled using an autotransformer, rectifier, and filter as are known in the art. During charging of the energy battery 20, the voltage was controlled so that the charging current remained below 18 Amperes, and the cell-group voltages were carefully monitored near the end of charge such that no cell-group voltage was ever allowed to exceed 4.20 volts.

In operation, the current to the motor reached a maximum of 385 Amperes during rapid acceleration. During regenerative braking the current returning to the power battery reached a maximum of 112 Amperes but only for a few seconds during an abrupt stop. Average motor current during typical driving was somewhat less than 40 Amperes. The power battery supplied the high current pulses with ease and accepted the regenerative braking pulses with very little overvoltage. When fully charged, the vehicle could be driven for about 180 km after which time the energy battery required recharging. The performance of the vehicle did not appear to deteriorate even after repeated recharging and use.

The weight of the energy battery 20 was 103 kg, while the power battery weighed 105 kg, for a total of about 210 kg. The volume occupied by the energy battery was 50 liters and that of the power battery was 60 liters, for a total 110 liters. These weights and volumes again do not include mounting, containment and cooling systems that in the improved system could be themselves lighter and smaller because of the lighter and smaller battery system.

Thus, the combination or hybrid battery storage device 15 of the present invention was much lighter, much smaller and much more effective than the conventional single-bank battery it replaced. The energy battery 20 in this example had a rated current of 48 Amperes (twelve parallel cells per group at 4 Amperes each) and could not possibly have delivered the 385 Ampere acceleration pulses delivered by the power battery 30 and required by the motor 100. However, the power battery 30, as illustrated by the conventional single bank battery was much heavier and larger. Thus, the storage device 15 of the present invention provided several benefits over the conventional single bank battery.

In a further preferred embodiment, the controller 60 utilizes "inherent control" to control the flow of electrical energy between the batteries 20, 30 and the load, such as the motor 100. In this embodiment, the controller 60 may initially operate to place the power battery in parallel with the energy battery. Furthermore, in this embodiment, the controller 60 may place both batteries 20, 30 in parallel with the motor 100. This is illustrated, for instance, in FIG. 3 and the electrical schematic diagram in FIG. 4.

In a preferred embodiment, the power battery 30 and the energy battery 20 are in parallel, and because of this, it is possible for the motor 100 to draw current I-1, I-2 from both simultaneously, in certain circumstances. Furthermore, the voltage of the two batteries 20, 30 would be the same in that they are connected in parallel. Accordingly, the voltages V-1, V-2 would be nominally approximately equal to each other, and, the current supplied to the motor 100 would be I-2 plus I-1.

It is also understood that the power battery 30 could provide electrical energy at a first range of power rates, which may vary according to a number of conditions, such as the number of cells in the power battery 30, the general impedance of each cell in the battery 30, the total impedance of the power battery 30, the charge level of the power battery 30, and the temperature and age of the power battery 30. Likewise, the energy battery 20 could provide electrical energy at a second range of power rates which may vary according to a number of conditions also, such as the number of cells in the energy battery 20, the general impedance of each cell in the energy battery 20, the total impedance of the energy battery, the temperature, charge level and age of the energy battery 20.

In the present context, the term "general impedance" is intended to refer to the impedance which results from the chemical reaction within the cells of each battery. The general impedance for an aqueous battery, such as a lead acid cell, will be generally 10% of the general impedance of a non-aqueous battery such as a lithium ion cell. The term "total impedance" as used in the present context refers to the impedance of the entire battery, including all of the cells, rather than the general impedance of a single cell. Thus, if a smaller lead acid power battery as compared to the lithium ion battery is used, then the total impedance of the smaller power battery 30 may rise and the total impedance of the larger lithium ion energy battery 30 will decrease. In the extreme case, if the energy battery 20 has a large number of lithium cells, and depending on the general impedance of the lithium cells, the total impedance of the lithium ion energy battery may not be that much greater than the total impedance of a much smaller lead acid battery having fewer cells and driven at a higher rate.

Accordingly, it is understood that when the two batteries 20, 30 are connected in parallel, they can be used to provide electrical energy to the motor at a combination of the first range of power rates and the second range of power rates. Because the power battery 30 will generally have a lower total impedance, the power battery 30 would more readily provide power to the motor 100 than the energy battery 20. Because of this, the power battery 30 will generally become discharged faster. This will result in the energy battery 20 substantially continuously recharging the power battery 30.

In order to facilitate this arrangement, it is preferred that the batteries 20, 30 are arranged such that the total voltage across all of the cells is nominally approximately equal. In this way, provided the batteries do not go below a critical voltage, the voltage across the two batteries would be equal such that V-1 approximately nominally equals V-2. In this embodiment, and provided the batteries 20, 30 remain in parallel with each other, the flow of electrical power, and, the currents I-1, I-2 and voltages V-1, V-2 will be inherently controlled as discussed in more detail below.

In a preferred embodiment, to facilitate inherent control, the total impedance of the power battery 30 will be 10% to 60% the total impedance of the energy battery 20. More preferably, the total impedance of power battery 30 is in the range of 35% to 50% and still more preferably, about 40%. This ratio of total impedance for the batteries 20, 30 has been found to give the best inherent control of the energy and power batteries 20, 30 and in particular lithium ion energy batteries 20 and lead acid power batteries 30.

Because the power battery 30 would have a lower energy density, it would also generally have a lower total impedance, so that the power battery 30 will generally supply a larger current I-2, particularly when there is a large demand placed on the batteries 20, 30 by the motor 100. Furthermore, when a large demand occurs, additional electrical power and current I-1 from the energy battery 20 would go towards satisfying the requirement of the motor 100. This would occur inherently because of the inherent characteristics of the batteries, 20, 30, such as the current and voltage at which they can supply electrical power, as well as the inherent general impedance of the cells and the total impedance of the batteries 20, 30, which is also a function of the ability of the batteries 20, 30 to supply voltage and current.

Figure 3:
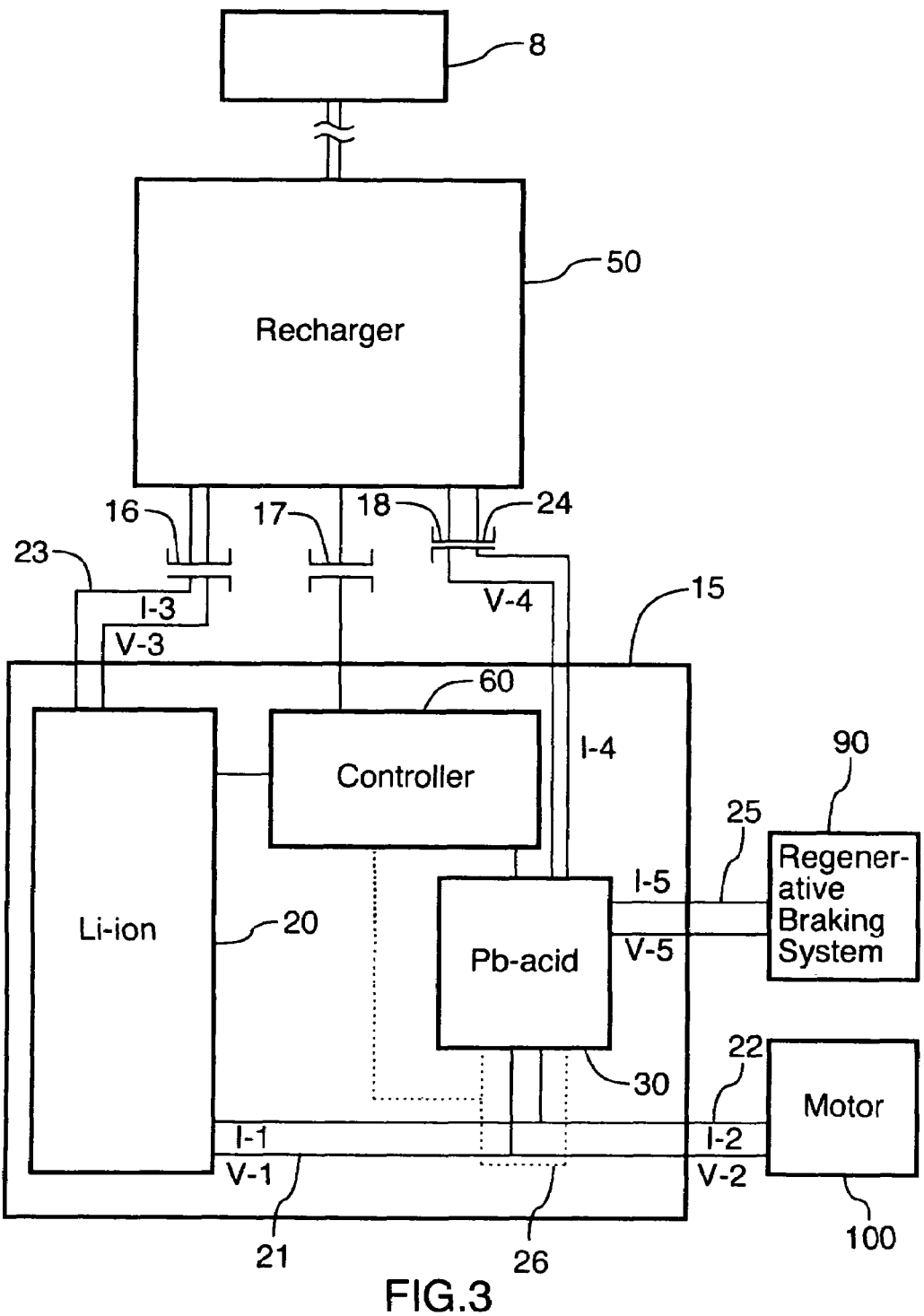
FIG. 3 shows an electrical system comprising an electrical storage device according to a further embodiment of the present invention.
Figure 6:
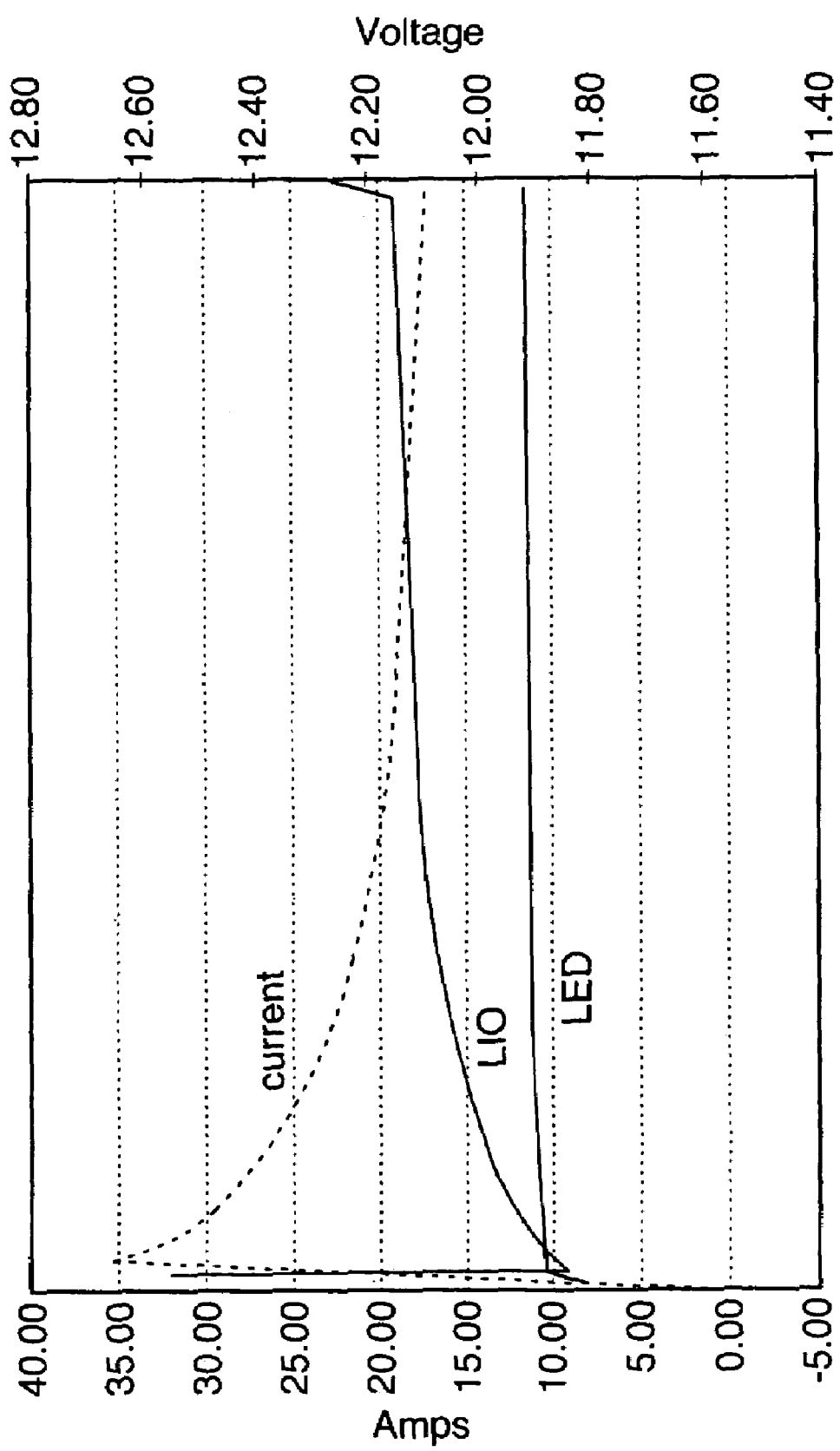
FIG. 6 illustrates a graph plotting of the voltage of a lithium ion energy battery and a lead acid power battery as well as the current from the lithium ion energy battery to the lead acid power battery against time when a fully charged lithium ion battery is initially connected to a nominally discharged lead acid battery in a preferred embodiment utilizing inherent control of the batteries.

FIG. 3 illustrates the connection being in parallel between the energy battery 20 and the power battery 30. A switch 26 is shown in dashed lines representing that a switch 26 may or may not be present. While the switch 26 is not necessarily required, it is possible that the switch 26 could be used in order to improve the efficiency of the device, and/or prevent damage to the energy battery 20 or power battery 30. When placing the batteries into a parallel arrangement, the controller 60 can be used to control a switch 26 to connect the batteries 20, 30 in parallel with the load 100 as shown in FIG. 3. Furthermore, a switch 26 could be used at the time of manufacture, and/or, if the voltage V-1 or V-2 go below the critical voltage, in order to place the batteries 20, 30 back into a parallel arrangement. In addition to, or replacement of a switch 26, a diode, a fuse or other electrical element could be used to protect and/or control the batteries 20, 30 and the load 100. In addition, as illustrated in FIG. 6, discussed more fully below, even connecting a fully charged lithium ion energy battery 20 directly to a nominally discharged lead acid power battery 30 would be possible depending on the inherent characteristics of the batteries 20, 30.

An example of inherent control utilizing a lithium ion battery energy battery 20 and a lead acid power battery 30 will now be provided. As discussed above, a number of lithium ion cells having a nominal voltage of 4.2 volts may be arranged in series to provide an energy battery 20 having the voltage V1. Likewise, a number of lead acid cells may be arranged in series to provide a power battery 30 having the voltage V2.

In this preferred embodiment utilizing inherent control, the voltage across the energy battery 20 and power battery 30 are nominally approximately equal. In this preferred embodiment, according to one example, eight lead acid batteries in series are used each having a nominal voltage of between 10.5V to 13V. In this way the nominal voltage V2 of the power battery will be between 84v and 104V. Likewise, 27 lithium cells in series may be used, each with a nominal voltage of between 3V and 4.2V providing a nominal voltage V-1 for the energy battery 20 of between approximately 81V and 113.4V. In this way, the range of nominal voltages of the two batteries 20, 30 when they are fully charged will preferably substantially overlap, such as in the range of 84V to 104V, thereby facilitating connecting the two batteries 20, 30 in parallel. Furthermore, in this embodiment, the power battery 30 could provide electrical energy at a first range of power rates, such as between 0 and 40 Kw to 60 Kw which may vary according to a number of conditions as outlined above. Likewise, the energy battery 20 could provide electrical energy at a second range of power rates such as between 0 and 8 Kw to 16 Kw which will also vary as described above. Therefore, in the situation where the load, such as a motor 100, requires a large amount of power, the batteries may both provide energy at the range between 0 to 8 Kw or 16 Kw and between 0 and 40 kw to 60 Kw for a total of 0 to 48 Kw or 76 Kw. However, in general, it is understood that the power battery 30 will more readily provide power to the load because of its lower total impedance.

In a further example utilizing inherent control, a single lead acid power battery 30 having 10 cells for a nominal voltage of between 10.5V to 13V is connected in parallel with 3 lithium cells connected in series for a nominal voltage of 9V to 12.6V. This could be used, for example, in smaller vehicles, such as in electric bicycle and handicap scooters which have lower variable power demands than automobiles and could be driven by smaller energy and power batteries 20, 30 rather than a lead acid battery or other types of batteries such as nickel-cadmium could be used at the power battery 30.

Figure 4:
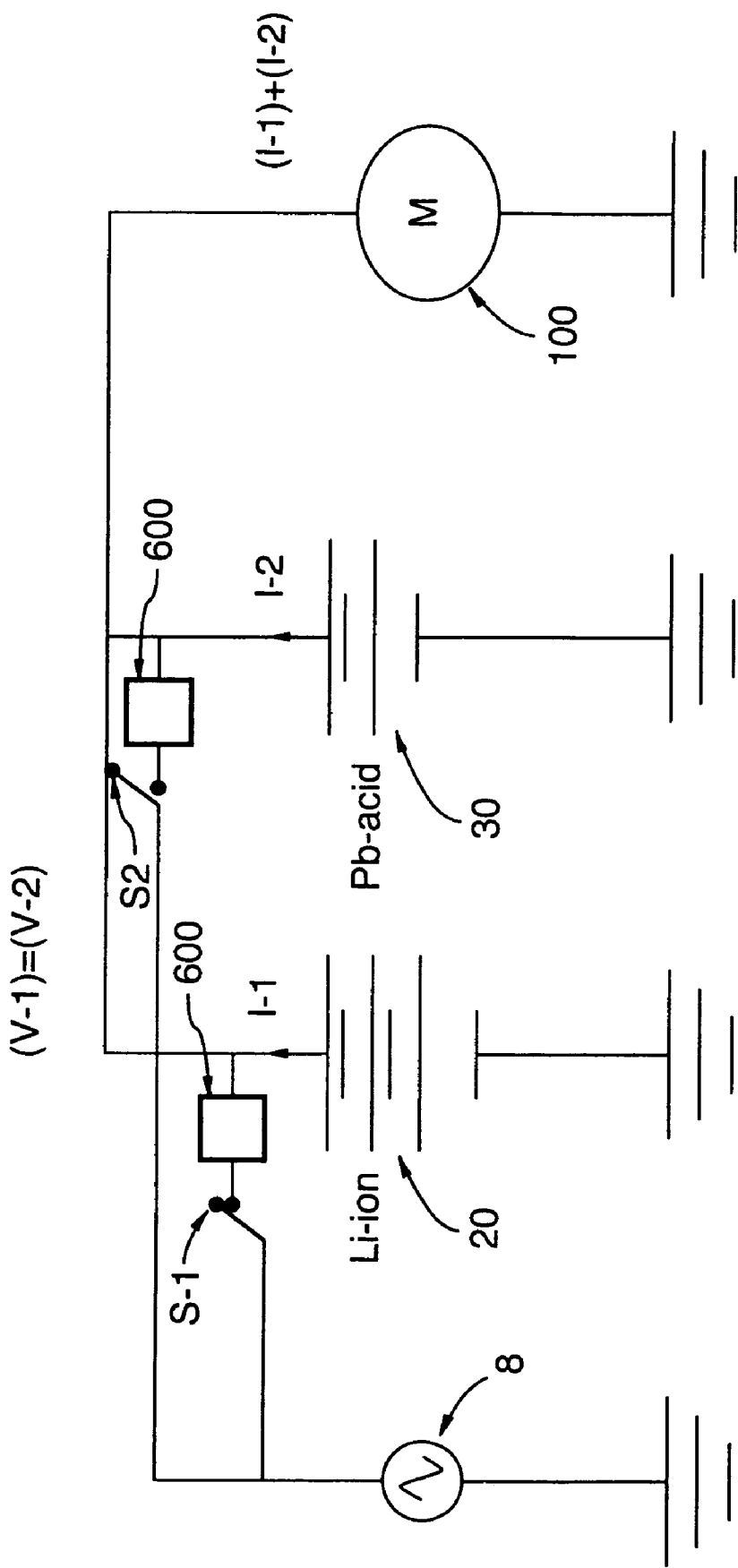
FIG. 4 shows an electrical schematic diagram of the electrical system illustrated in FIG. 3 according to a further embodiment of the present invention.

FIG. 4 illustrates an electrical schematic diagram of the electrical system illustrated in FIG. 3 according to a further preferred embodiment utilizing inherent control. As illustrated in FIG. 4, the lead acid power battery 30 is connected in parallel with the lithium ion energy battery 20 to the load 100. FIG. 4 also shows the external power connection 8 connected through switches S1, S2 to the energy battery and energy battery 20, 30. The switches S1, S2 correspond to the connections 16, 24 shown in FIG. 3 for connecting the recharger 50 to the device 15. In addition, recharger circuitry 600 may be provided, which for clarity are not illustrated in FIG. 4.

In operation, the preferred embodiment illustrated in FIG. 4 utilizing inherent control operates by initially bringing the voltage V1 of the energy battery 20 to be nominally approximately the same as the voltage V2 of the power battery 30. In this way, V1 nominally approximately equals V2, and the energy battery 20 is connected in parallel with the power battery 30, and, also connected to the load 100. Furthermore, in a preferred embodiment, the total impedance of the energy battery 30 would be between 10% to 60% and, more preferably 35% to 50% of the total impedance of the energy battery 20. During operation, it would be assumed that the switches S1, S2 would be open, representing that the recharger 50 would not be connected to the device.

The energy battery 20 and the power battery 30 would both supply current I1, I2, respectfully, in order to maintain their voltage equal. Furthermore, because the energy battery 30 has a lower total impedance, the energy battery 30, such as an embodiment where it is a lead acid battery, would supply a larger current I2 and the current I2 could fluctuate more in order to meet the differential current requirements of the load 100. However, it is understood that the power requirements of the load 100 may be supplied by both energy battery 20 and power battery 30 when the load 100 is operating at a high power requirement. In other words, in this embodiment, current I1, I2, and therefore electrical power, may be drawn from the energy battery 20 and the power battery 30, but in different proportions. Furthermore, it is understood that the current I2 from the energy battery 30, and therefore the power, would fluctuate more, thereby meeting the differential current and power requirements for the load 100.

It is understood that the energy may be drawn from the power battery 30 faster than from the energy battery 20 at least for the reasons stated above. Accordingly, the energy stored in the power battery 30 may drop, and result in a corresponding drop in the voltage V2 of the power battery 30. When this occurs, current I1 from the energy battery 20 may be drawn to the energy battery 30 to assist in recharging the power battery 30. This could occur, for example, even when the load 100 is not operating.

Figure 5:
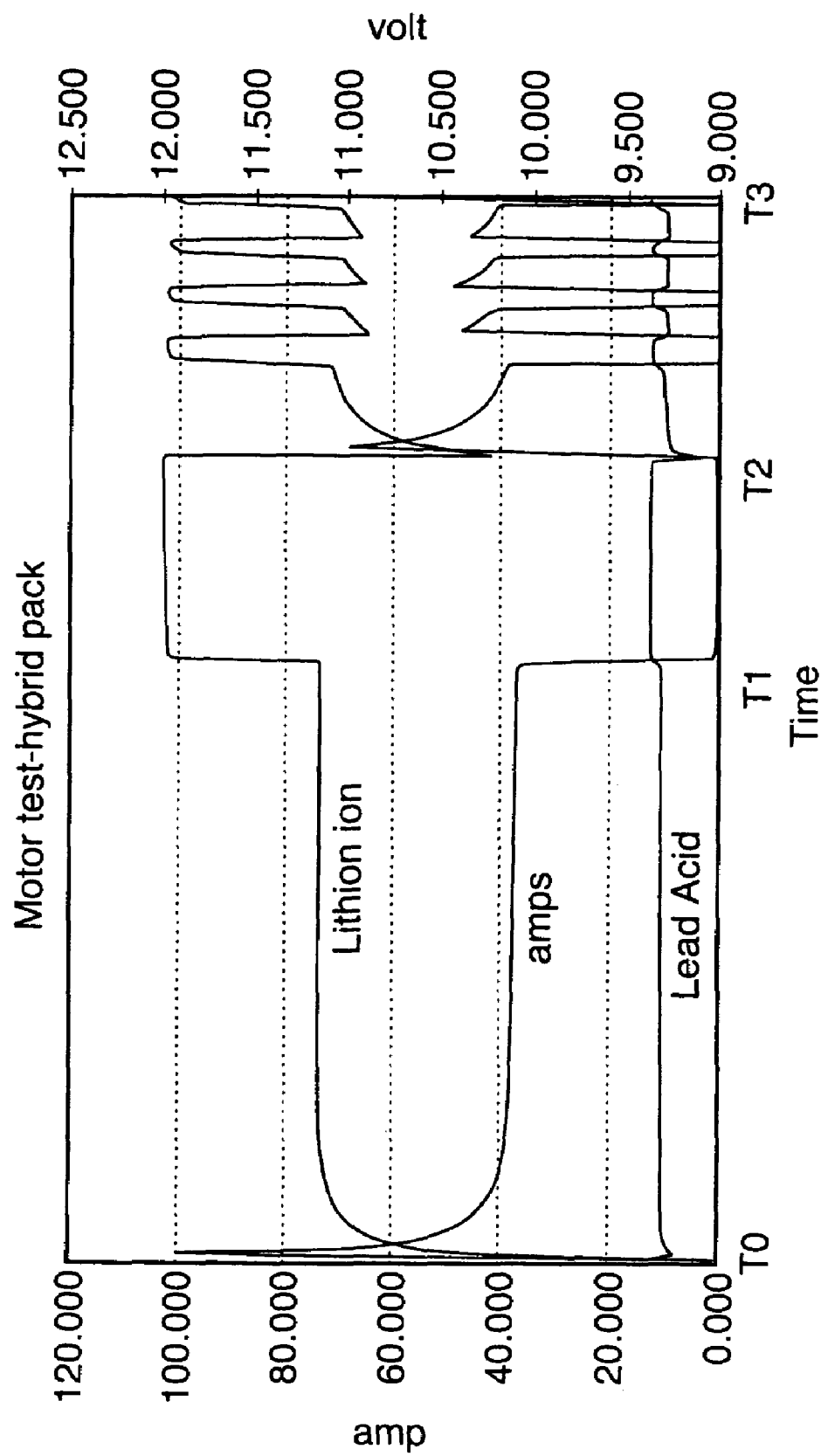
FIG. 5 illustrates a graph plotting of the voltage of the lithium ion energy battery and a lead acid power battery as well as the combined current from the lithium ion and lead acid batteries to a load against time as the load is activated and deactivated in a preferred embodiment utilizing inherent control of the lithium ion battery and lead acid battery.

FIG. 5 illustrates a graph plotting showing the voltage of the lithium ion energy battery 20 and the lead acid power battery 30 against time. FIG. 5 also illustrates the combined current in Amps being applied towards the load, namely a motor 100 in this example, against time on the horizontal axis. In particular, it is noted that the motor is turned on at time T0 and turned off at time T1. Furthermore, the motor is turned on at time T2 and then cycled on and off between time T2 and time T3.

As illustrated in FIG. 5, the current applied to the load initially spikes when a load is turned on at T0 and then levels out at a value below 40 amps. Similarly, the voltage of the lithium ion battery 20 and power battery 30 are initially just over 11 volts and 9 volts, respectively but increase when the load 100 is turned on indicating that a higher demand is being placed on the batteries 20, 30. In particular, it is noted that the lithium ion battery voltage increases on a percentage basis by about 10% while the voltage of the power battery 30 increases much less, indicating that the total impedance of the lithium ion battery 20 is much higher than that of the power battery 30. It is also apparent that because the lithium ion battery 20 consistently has a higher voltage by about 2 volts than the power battery 30, the lithium ion battery will be substantially continuously recharging the lead acid battery even when the load 100 is not operating.

FIG. 6 illustrates the initial connection of a lithium ion energy battery 20 to a lead acid power battery 30. In FIG. 6, the lead acid battery is substantially fully discharged, within nominal ranges, when the lithium ion battery is substantially fully charged, within nominal ranges. As illustrated in FIG. 6, upon initial connection, there is an increased current up to 35 amps from the lithium ion battery to the lead acid power battery 30. There is also an initial decrease in the voltage of the lithium ion battery and a short initial increase of the lead acid battery. Over time, however, additional current travels from the lithium ion battery to the lead acid battery indicating that the lithium ion battery is substantially continuously recharging the lead acid battery.

Figure 7:
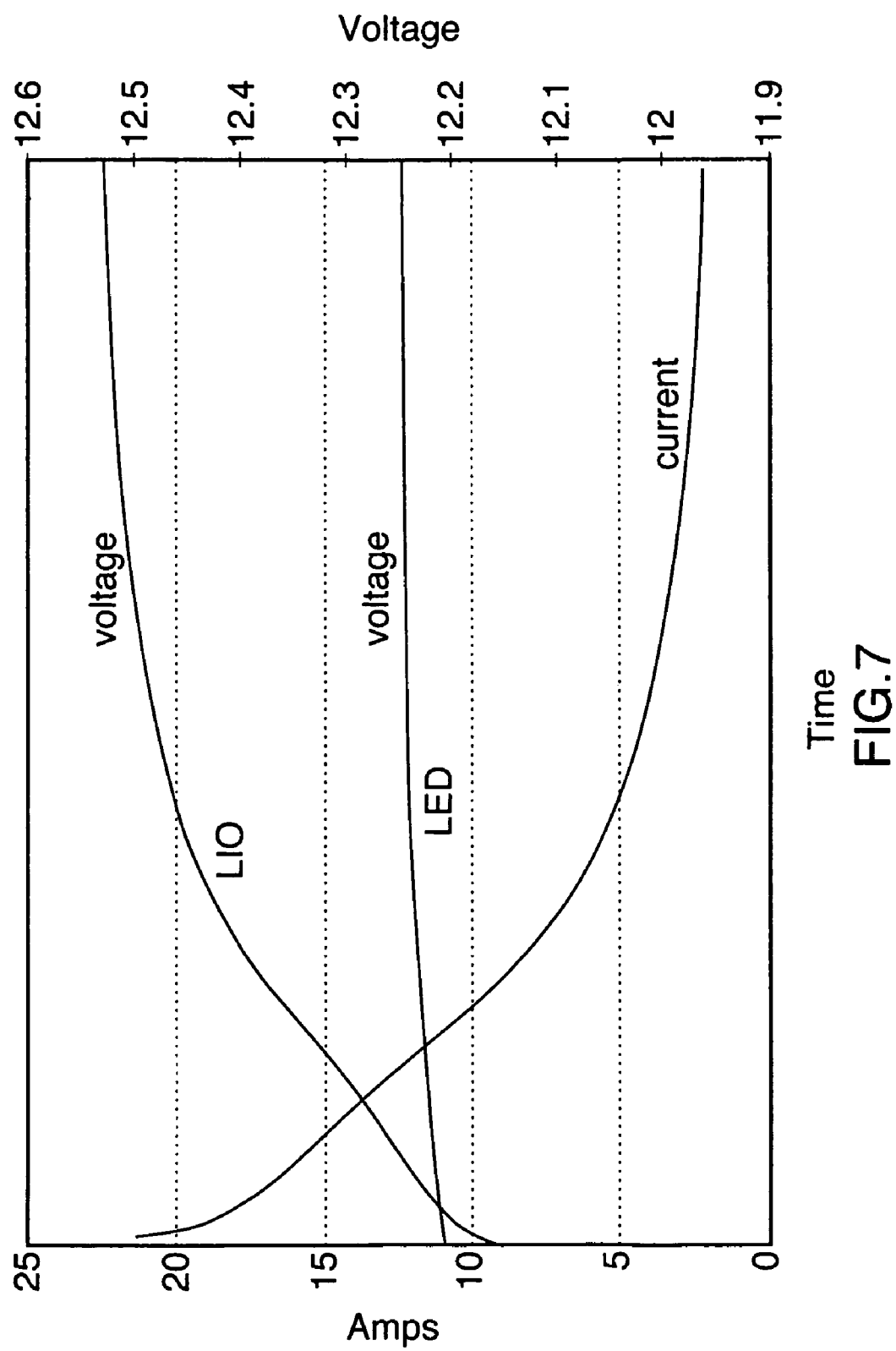
FIG. 7 illustrates a graph plotting of the voltage of a lithium ion energy battery and a lead acid power battery as well as the current from the lithium ion to the lead acid battery against time when a fully charged lithium ion battery is initially connected to a fully charged lead acid battery in a preferred embodiment utilizing inherent control.

FIG. 7 is similar to FIG. 6 except that the lead acid battery in FIG. 7 is not nominally discharged at the time of connection. As indicated in FIG. 7, the current from the lithium ion battery to the lead acid battery decays from about 20 amps towards substantially 0 amps as the lithium ion battery substantially continuously recharges the lead acid battery. It is noted that the voltage of the lithium ion battery is generally always more than the lead acid battery, and there is a positive current from the lithium ion battery to the lead acid battery, illustrating that the lithium ion battery substantially continuously recharges the lead acid power battery 30.

A further benefit of the battery storage device 15 of the present invention is exhibited by the flexibility of location of the two batteries 20, 30. The power battery 30 supplying high current pulses are preferably located near the motor to minimize the length of expensive, heavy and resistive wiring. In the original conventional vehicle it was not possible to locate the entire battery near the motor because of its large size and weight, and therefore additional cable, at additional cost and total weight was required. In the reconstructed vehicle, the power battery 30 was located near the motor 100 to decrease the cost and weight associated with heavy and expensive cables along the second connection 22. However, the energy battery 20 with its relatively low current, can use less heavy and expensive cable, for the first connection 21 to the power battery 30, and thus can be located remote from the motor 100, and the power battery 30, without the need for heavy and expensive cables.

It is understood that while the present invention has been described in terms of the preferred embodiment where the energy battery 20 is a non-aqueous lithium ion battery, the energy battery 20 is not restricted to this type of battery. Rather, any type of battery having an energy density greater than the energy density of the power battery, such as for example a sodium-sulfur battery, a lithium-air battery or chemical equivalent, could be used. In one of the preferred embodiments, the energy battery 20 comprises a polymer lithium ion battery which can be molded to various shapes, thereby decreasing the effective volume of the energy storage device 15.

Likewise, while the present invention has been described in terms of a power battery 30 comprising a lead-acid battery 30, the present invention is not limited to this. Rather, any type of power battery 30 which can be recharged by an energy battery 20, such as a lithium battery, and provide the electrical energy at different rates as required by the load 100 can be utilized such as, for example, high-rate lithium or lithium-ion batteries and high-rate nickel aqueous batteries.

It is understood that the terms "cells" and "batteries" have been used interchangeably herein, even though a battery has a general meaning to be more than one cell. This reflects that both the energy battery 20 and the power battery 30 may be batteries or cells. Furthermore, the "cells" referred to in this application, including the examples given above, is intended to include banks of cells in parallel. For instance, reference to connecting 27 lithium cells in series is intended to also include connecting 27 lithium banks of cells in series, together with two or more cells in the banks connected to each other in parallel.

It is also understood that the present invention, as illustrated in FIG. 1, may include other devices and components including filters, capacitors, inductors and sensors, as is known in the art to operate the device 15, which have been omitted for clarity. It is also understood that the load 100 may be any type of electrical load drawing electrical power at different rates, even though a preferred embodiment has been described in terms of the load being a motor in an electric vehicle. In this regard, it is understood that the electric vehicle may be any type of vehicle including automobiles, trucks, motorcycle and electric bicycles.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. A power source for supplying electrical power to a driving motor, said driving motor drawing electrical power at different rates, the power source comprising:
   a first rechargeable energy battery having a first total impedance for storing electrical energy and providing electrical power to the electrical motor at a first range of power rates;
   a second rechargeable power battery having a second total impedance, less than the first total impedance, for storing electrical energy and providing electrical power to the electrical motor at a second range of power rates;
   wherein the energy battery is directly connected in parallel with the power battery and the driving motor such that the electrical energy stored in the energy battery is provided to the driving motor in combination with electrical energy stored in the power battery; and wherein the energy battery substantially continuously recharges the power battery with any excess power not provided to the driving motor; said power source further comprising a battery controller capable of controlling the substantially continuous recharging of the power battery with electrical energy from the energy battery not require by the driving motor;

wherein the battery controller utilizes inherent control of the energy battery and power battery, such that the battery controller initially connects the power battery and energy battery in parallel.

2. The power source as defined in claim 1 wherein the battery controller controls the substantially continuous recharging of the power battery by controlling the electrical energy passing through a first connection from the energy battery to the power battery.

3. The power source as defined in claim 1 wherein the controller initially connects each of the power battery, energy battery and electrical motor in parallel.

4. The power source as defined in claim 1 wherein the power battery and energy battery have a range of overlapping nominal voltages.

5. The power source as defined in claim 4 wherein the energy battery substantially continuously recharges the power battery with any excess power not used by the driving motor.

6. The power source as defined in claim 5 wherein the power battery consists of at least one bank of 8 lead acid batteries in series, each lead acid battery having a nominal voltage of 10.5 volts to 13 volts and the energy battery consists of at least one bank of 27 lithium ion cells connected in series, each lithium ion cell having a nominal voltage of 3 volts to 4.2 volts.

7. The power source as defined in claim 1 wherein the second total impedance is between 10% to 60% of the first total impedance.

8. The power source as defined in claim 7 wherein the second total impedance is between 35% to 50% of the first total impedance.

9. The power source as defined in claim 1 further comprising a switch between the energy battery and the power battery; and wherein the controller initially connects the power battery to the energy battery in parallel by controlling the switch along the first connection.

10. The power source as defined in claim 1 wherein the energy battery is a lithium based battery selected from the group consisting of non-aqueous lithium-ion batteries, lithium air batteries and polymer lithium ion batteries, and, the power battery is a lead-acid battery.

11. The power source as defined in claim 1 wherein the energy battery is a non-aqueous polymer lithium battery pack.

12. The power source as defined in claim 11 wherein the power source has a casing and a portion of the casing is occupied by the non-aqueous polymer lithium battery pack.

13. The power source as defined in claim 3 wherein the driving motor drives a vehicle within which the power battery and energy battery are contained and, wherein the controller can be contained within or removed from the vehicle.

14. A method for storing electrical energy for an electrical load drawing electrical power at different rates, said method comprising:

charging a rechargeable energy battery having a first total impedance;

charging a rechargeable power battery having a second total impedance, less than the first total impedance;

supplying electrical energy from the energy battery and the power battery to the electrical load, said rechargeable power battery, said rechargeable energy battery and said electrical load are connected to each other in parallel such that electrical energy stored in the energy battery is provided to the electrical load in combination with energy stored in the power battery when required by the electrical load, and, when not required by the electrical load electrical energy from the energy battery substantially continuously recharges the power battery;

substantially continuously recharging the power battery from the energy battery with electrical energy not required by the electrical load, by utilizing inherent control of the energy battery and power battery.

15. A method as defined in claim 14 further comprising: connecting the energy battery in parallel with the power battery prior to connecting the energy battery to the load.

16. A method as defined in claim 14 wherein the electrical load is a driving motor in a vehicle to drive the vehicle, and, the rechargeable energy battery and the rechargeable power battery are contained in the vehicle with the power battery located nearer the driving motor than the energy battery.

17. A method as defined in claim 16 further comprising: periodically recharging the energy battery, from an external fixed electrical source, when the energy capacity of the energy battery falls below a threshold.

18. A method as defined in claim 14 wherein the rechargeable energy battery is selected from the group consisting of non-aqueous lithium-ion batteries, lithium air batteries, polymer lithium-ion batteries and sodium-sulfur batteries; and wherein the rechargeable power battery is selected from the group consisting of lead-acid batteries, high-rate lithium batteries, lithium-ion batteries, high-rate nickel aqueous batteries, nickel metal batteries, nickel alloy hybrid bearing batteries and nickel cadmium batteries.

* * * * *